United States Patent
Low et al.

(10) Patent No.: US 10,389,236 B1
(45) Date of Patent: Aug. 20, 2019

(54) DISTURBANCE QUELLING

(71) Applicant: pSemi Corporation, San Diego, CA (US)

(72) Inventors: Aichen Low, Cambridge, MA (US); Gregory Szczeszynski, Hollis, NH (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 15/939,815

(22) Filed: Mar. 29, 2018

(51) Int. Cl.
*H02M 3/07* (2006.01)
*H02M 3/24* (2006.01)

(52) U.S. Cl.
CPC .............. *H02M 3/07* (2013.01); *H02M 3/24* (2013.01)

(58) Field of Classification Search
CPC .................................. H02M 3/07; H02M 3/24
See application file for complete search history.

(56) References Cited

U.S. PATENT DOCUMENTS

2009/0278520 A1* 11/2009 Perreault ................. H02M 3/07
323/282
2010/0308654 A1* 12/2010 Chen .................... H02M 3/1584
307/31

* cited by examiner

*Primary Examiner* — Daniel C Puentes
(74) *Attorney, Agent, or Firm* — Occhiuti & Rohlicek LLP

(57) ABSTRACT

A power converter that supplies a constant output voltage includes a regulator that connects to a charge pump. The charge pump is operable in plural charge-pump modes. A controller preemptively suppress evidence of occurrence of a transition between said charge-pump modes.

20 Claims, 10 Drawing Sheets

DISTURBANCE QUELLING

FIELD OF DISCLOSURE

This disclosure relates to power converters, and in particular, to reconfigurable power converters comprising a switched-capacitor network and a regulator.

BACKGROUND

Power converters generally have a component that transforms a voltage from a first value to a second value. Inevitably, there are constraints on just what the second value can be. These constraints define the operating range of the power converter.

One way to extend the operating range of a power converter is to reconfigure it so that it operates in a different operating mode. This can be done on-the-fly, while the power converter is actually operating. This results in a new operating range.

There is, however, a drawback to doing so.

In most physical systems, any sort of step change tends to bring with it some kind of transient response. Eventually, the transient dies down and a new steady-state prevails. However, even short transients are potentially troublesome in a power converter.

SUMMARY

In one aspect, the invention concerns reducing the adverse effects of transients when reconfiguring a power converter. These transients manifest themselves as disturbances in the power converter's output voltage. The invention thus provides a way to quell such disturbances.

The nature of the disturbance depends on which components of the power converter are being reconfigured. For example, the disturbances that arise when reconfiguring a regulator may differ in nature from those that arise when reconfiguring a charge pump or switched-capacitor network. To accommodate such differences, the invention provides component-specific quelling circuitry to optimally target particular component reconfigurations.

In another aspect, the invention features a controller that is configured to control operation of a power converter that supplies a constant output voltage. The power converter includes a regulator that connects to a charge pump that is operable in plural charge-pump modes. The controller pre-emptively suppresses evidence of occurrence of a transition between the charge-pump modes.

In some embodiments, the controller includes a feedback controller that is configured to relinquish control over the output voltage during the transition between the charge-pump modes and to recover the control after the transition between the charge-pump modes.

In other embodiments, the controller includes a transient controller that controls the output voltage during the transient and a steady-state controller that controls the output voltage at times other than during the transient. In such embodiments, controlling the output voltage includes causing the output voltage to move towards a target value of output voltage.

In yet other embodiments, the controller determines a signal for controlling the regulator in response to information indicative of a forthcoming transition between the charge-pump modes and information concerning operation of the power converter. It then applies the signal to cause a change in the regulator's duty cycle during the transition between charge-pump modes. This change in duty cycle is one that has been selected to quell a disturbance in the output voltage.

Other embodiments include those in which the controller determines a new duty cycle for a switch in the regulator and causes a step change to the new duty cycle during an interval within a clock cycle of the occurrence of a transition between the charge-pump modes. This new duty cycle is one that has been selected to quell a disturbance in the output voltage.

In other embodiments, the controller determines, based at least in part on information indicative of a forthcoming occurrence of a transition between the charge-pump modes and information indicative of operation of the power converter, an offset between a compensation voltage provided to the regulator and a waveform that is used to open and close a switch in the regulator. It then applies this offset during the transition. The offset controls a duty cycle of a switch in the regulator and does so in order to quell a disturbance in the output voltage.

In yet other embodiments, the controller bypasses feedback control over the output voltage in anticipation of the occurrence of a transition between the charge-pump modes and recovers feedback control after the transition.

Also among the embodiments are those in which the controller ceases feedback control over the output voltage in anticipation of the occurrence of a transition between the charge-pump modes. In these embodiments, the controller exercises feed-forward control during the transition and recovers feedback control after the transition.

In further embodiments, the controller applies a voltage that, during steady-state operation, would cause the output voltage of the power converter to move away from a target value.

In other embodiments, the controller is configured to expect, based at least in part on information concerning a forthcoming occurrence of a transition between the charge-pump modes and information concerning power converter operation, a direction of an expected transient and applies a voltage that moves the output voltage contrary to the direction.

In other embodiments, the controller is configured to expect, based at least in part on information concerning a forthcoming occurrence of a transition between the charge-pump modes and information concerning power converter operation, that a transient resulting from the transition will cause the output voltage to fall below a target voltage and to cause the regulator to deliver more energy to support the output voltage thereby at least partially compensating for the transient.

In other embodiments, the controller is configured to expect, based at least in part on information concerning a forthcoming occurrence of a transition between the charge-pump modes and information concerning power converter operation, that a transient resulting from the transition will cause the output voltage to fall below a target voltage and to increase a duration during which a switch in the regulator connects an inductance to the charge pump.

In other embodiments, the controller is configured to expect, based at least in part on information concerning a forthcoming occurrence of a transition between the charge-pump modes and information concerning power converter operation, that a transient resulting from the transition will cause the output voltage to rise above a target voltage and to cause the regulator to deliver less energy to support the output voltage thereby at least partially compensating for the transient.

In other embodiments, the controller is configured to expect, based at least in part on information concerning a forthcoming occurrence of a transition between the charge-pump modes and information concerning power converter operation, that a transient resulting from the transition will cause the output voltage to fall below a target voltage and to permit current to flow through an inductor in the regulator.

In another aspect, the invention features an apparatus for quelling disturbances that arise in operating a power converter that includes a charge pump and a regulator. Such an apparatus includes a control system that anticipates a change in the charge pump's voltage-transformation ratio and that then pre-emptively reduces transients that would otherwise result from such a change.

In some embodiments, the control system comprises a feedback controller that avoids exercising feedback control over the power converter at selected times.

In other embodiments, the control system includes a feedback controller that interrupts feedback control over the power converter prior to the change and that then recovers feedback control over the power converter following the change.

The power converter has an output voltage and a target output-voltage. A difference between the output voltage and the target output-voltage of the power converter defines an error. In some embodiments, the control system transmits, to the regulator, a signal that, during steady-state operation of the power converter, would cause the regulator to increase the error between the power converter's target output-voltage and its output voltage.

In some embodiments, the regulator is configured to provide charge to the charge pump. However, during an interval surrounding the change, the control system causes the regulator to provide a current path that causes current to leave the charge pump and enter the regulator.

BRIEF DESCRIPTION OF THE DRAWINGS

These and other features and advantages of the invention will be apparent from the following detailed description and the accompanying figures, in which.

In some of the figures, there are lines that lead from a controller to a switch. These are lines used to control the state of the switch. In the context of a transistor switch, these are lines that control the gate terminal.

DETAILED DESCRIPTION

Figure 1:
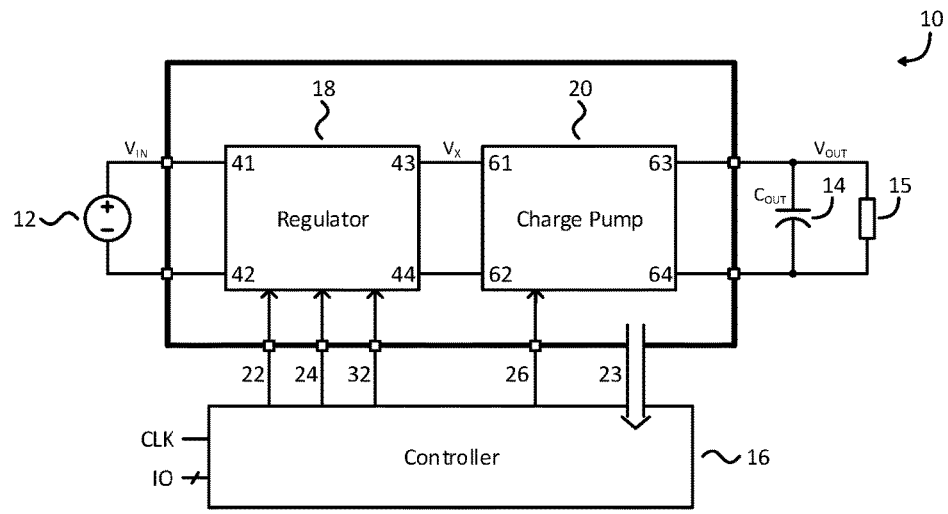
FIG. 1 shows a step-up power converter having a regulator and a charge pump.

FIG. 1 shows a power converter 10 for receiving an input voltage $V_{IN}$ provided by a voltage source 12. The power converter 10 transforms the input voltage $V_{IN}$ into an output voltage $V_{OUT}$ and makes it available at an output capacitor 14 across which is connected a load 15. The power converter 10 includes a controller 16, a regulator 18, and a charge pump 20. As used herein, the term "charge pump" refers to a switched-capacitor network.

Figure 4:
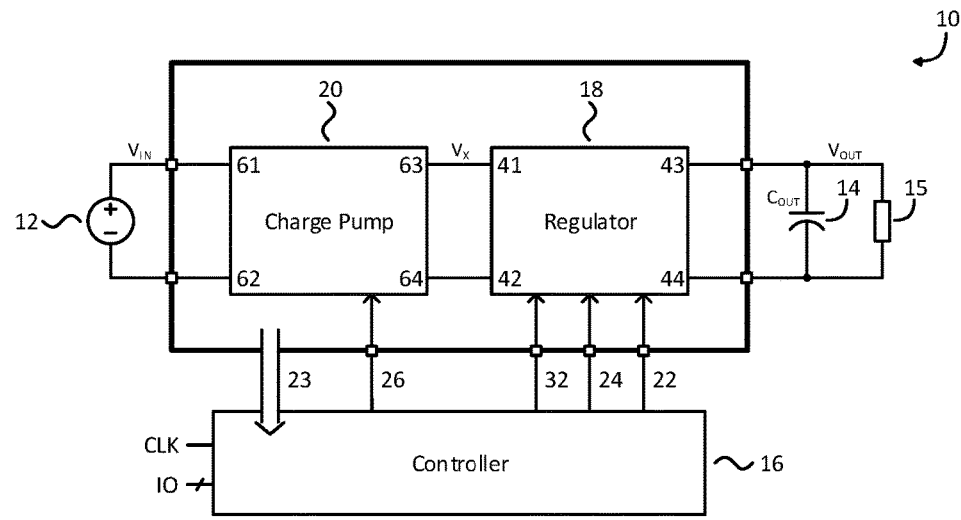
FIG. 4 shows a power converter similar to that shown in FIG. 1, but adapted to operate as a step-down power converter.

The regulator 18 and the charge pump 20 connect to each other. In FIG. 1, the two are connected such that the regulator 18 receives the input voltage $V_{IN}$ and the charge pump 20 provides the output voltage $V_{OUT}$. In FIG. 4, this connection is reversed such that the charge pump 20 receives the input voltage $V_{IN}$ and the regulator 18 provides the output voltage $V_{OUT}$. The power converter 10 can be a step-up or a step-down power converter. In a step-up power converter, the output voltage $V_{OUT}$ exceeds the input voltage $V_{IN}$. In a step-down converter 10, the converse is true.

In FIG. 1, the power converter 10 is a step-up power converter in which the regulator 18 receives the input voltage $V_{IN}$. It then generates an intermediate voltage $V_X$ and provides that intermediate voltage $V_X$ to the charge pump 20. The charge pump 20 then transforms the intermediate voltage $V_X$ into an output voltage $V_{OUT}$ that is higher than the input voltage $V_{IN}$.

The controller 16 receives a set of input signals and produces a set of output signals. Some of these input signals arrive along an input-signal path 23. These input signals carry information that is indicative of the power converter's operation. The controller 16 also receives a clock signal CLK and external signals 10 that are either analog, digital, or a combination of both. Based upon the signals that the controller 16 receives, it produces first, second, third, and fourth control-signals 22, 24, 26, 32 that together control the operation of the regulator 18 and the charge pump 20.

Figure 2A:
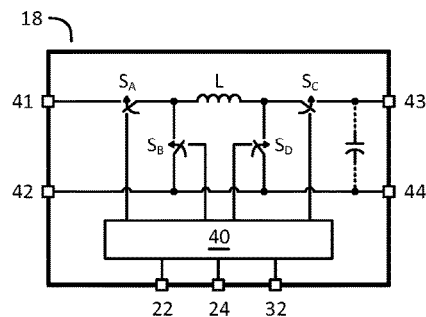
FIG. 2A shows an embodiment of the regulator in FIGS. 1 and 4.

FIG. 2A shows a regulator 18 that receives an input voltage across first and second regulator-terminals 41, 42 and produces an output voltage across third and fourth regulator-terminals 43, 44. In addition to an inductor L, the regulator 18 includes first, second, third, and fourth regulator-switches $S_A$, $S_B$, $S_C$, $S_D$. A switch-control circuit 40 controls these switches according to the first, second, and fourth control-signal 22, 24, 32.

In the illustrated embodiment, the regulator 18 can be reconfigured to operate in different modes. The first control-signal 22 causes such reconfiguration. However, in general, the regulator 18 does not have to be reconfigurable.

When the regulator 18 operates in buck mode, the third regulator-switch $S_C$ remains "on" while the fourth regulator-switch $S_D$ remains "off" throughout every switching cycle. The first regulator-switch $S_A$ transitions between being "on" and "off" based on the duty cycle or on-time of the regulator 18 as determined by the second control-signal 24. The second regulator-switch $S_B$ may transition between being "on" and "off" so that its state is complementary to that of the first regulator-switch $S_A$. Some implementations of such a regulator 18 omit the fourth regulator-switch $S_D$ and replace the third regulator-switch $S_C$ with a direct connection to the third regulator-terminal 43.

When the regulator 18 operates in boost mode, the first regulator-switch $S_A$ remains "on" while the second regulator-switch $S_B$ remains "off" throughout every switching cycle. The fourth regulator-switch $S_D$ transitions between being "on" and "off" according to the duty cycle or on-time of the regulator 18 as determined by the second control-signal 24. The third regulator-switch $S_C$ transitions between being "on" and "off" so that its state is complementary to that of the fourth regulator-switch $S_D$. Some implementations reduce the number of switches to just two by omitting the second regulator-switch $S_B$ and replacing the first regulator-switch $S_A$ with a direct connection to first regulator-terminal 41.

When the regulator 18 operates in buck-boost mode, the first, second, third, and fourth regulator switches $S_A$, $S_B$, $S_C$, $S_D$ transition between being "on" and being "off" some at the same time and some at different times during each switching cycle as determined by the second control-signal 24. The switch-control circuit 40 controls and sequences transitions of all the regulator switches $S_A$-$S_D$ in such a way as to incorporate any necessary dead-time needed during operation of the first, second, third, and fourth regulator switches $S_A$, $S_B$, $S_C$, $S_D$ according to buck mode, boost mode or buck-boost mode as determined by the first control-signal 22.

Based on information indicative of the power converter's operation, the controller 16 sends a second control-signal 24 to control the duty cycle of the regulator switches $S_A$-$S_D$ and to therefore regulate the output voltage across the third and fourth regulator terminals 43, 44. As such, it defines a feedback loop using some or all of the signals received along the input-signal path 23, the clock signal CLK, and the external signals 10.

Figure 2B:
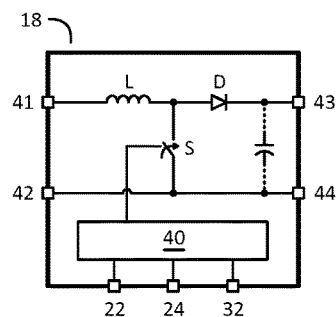
FIGS. 2B-2E show alternative regulators for use with the power converter in FIGS. 1 and 4.
Figure 2C:
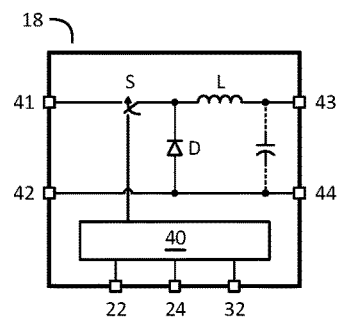
Figure 2D:
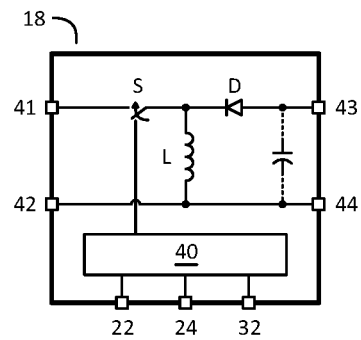
Figure 2E:
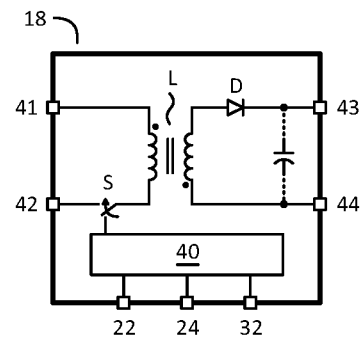

Many other regulator configurations regulate by having switches that periodically cause an inductor to transition between first and second states. Examples of such regulator configurations are a boost converter, shown in in FIG. 2B, a buck converter, shown in in FIG. 2C, a buck-boost converter, shown in in FIG. 2D, and a flyback converter, shown in FIG. 2E. Because the regulators shown in FIGS. 2B-2E are not reconfigurable, the first control-signal 22 is unnecessary. However, the regulators shown in FIGS. 2B-2E all feature a switch S that modulates an inductor L, thereby enabling voltage regulation. In some cases, the inductor L stands alone, as shown in FIG. 2B-2D. In other cases, the inductor L is part of a transformer, as shown in FIG. 2E. Other suitable regulators, which are not shown, include Cuk converters, SEPIC converters, resonant converters, multi-level converters, Forward Converters, and Full-Bridge Converters.

The regulator 18 is not the only circuit that can be made reconfigurable. In some embodiments the charge pump 20 is also reconfigurable. In the case of the charge pump 20, reconfiguration changes the charge pump's voltage-transformation ratio. The charge pump's operating modes therefore correspond to its different voltage-transformation ratios. Based on information indicative of the power converter's operation, the controller 16 sends a third control-signal 26 to cause transitions between charge-pump operating modes.

Figure 3:
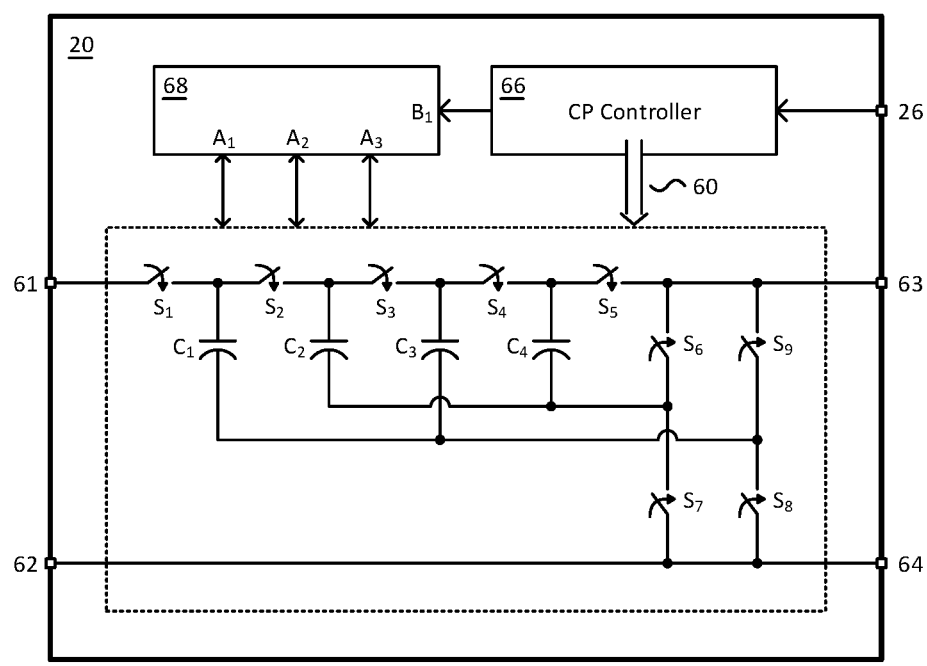
FIG. 3 shows an embodiment of the charge pump in FIGS. 1 and 4.

FIG. 3 shows a charge pump 20 that receives an input voltage across first and second charge-pump terminals 61, 62 and produces a voltage across third and fourth charge-pump terminals 63, 64. The charge pump 20 is a single-phase symmetric cascade multiplier having first, second, third, fourth, and fifth stack-switches $S_1$, $S_2$, $S_3$, $S_4$, $S_5$, and first, second, third, and fourth phase switches $S_6$, $S_7$, $S_8$, $S_9$. Of these, the first, third, and fifth stack-switches $S_1$, $S_3$, $S_5$ define a set of "odd stack-switches" and the second and fourth stack-switches $S_2$, $S_4$ define a set of "even stack-switches." Similarly, the first and third phase switches $S_6$, $S_8$ define a set of "even phase-switches" and the second and fourth phase-switches $S_7$, $S_9$ define a set of "odd phase-switches."

The charge pump 20 also includes first, second, third, and fourth capacitors $C_1$, $C_2$, $C_3$, $C_4$. Together with the switches, these define "stages" within the charge pump 20.

The illustrated charge pump 20 has four stages. Each stage includes one of the capacitors $C_1$, $C_2$, $C_3$, $C_4$ and one of four corresponding stack-switches $S_1$, $S_2$, $S_3$, $S_4$. The first stage includes the first stack-switch $S_1$ and the first capacitor $C_1$; the second stage includes the second stack-switch $S_2$ and the second capacitor $C_2$; the third stage includes the third stack-switch $S_3$ and the third capacitor $C_3$; and the fourth stage includes the fourth stack-switch $S_4$ and the fourth capacitor $C_4$. In the embodiment shown in FIG. 3, the maximum voltage-transformation ratio is five because there are four stages.

In response to receiving the third control-signal 26, a charge-pump controller 66 places operation control-signals on a control-signal path 60. These operation control-signals cause the first, second, third, fourth, and fifth stack-switches $S_1$, $S_2$, $S_3$, $S_4$, $S_5$ and the first, second, third, and fourth phase switches $S_6$, $S_7$, $S_8$, $S_9$ to change states according to a specific sequence. As a result, the charge pump 20 repeatedly transitions between first and second operating-states at a specific frequency.

For example, during a first operating-state, the charge-pump controller 66 closes the odd stack-switches $S_1$, $S_3$, $S_5$ and the odd phase-switches $S_7$, $S_9$ and opens the even stack-switches $S_2$, $S_4$ and the even phase switches $S_6$, $S_8$. In contrast, during a second operating-state, the charge-pump controller 66 opens the odd stack-switches $S_1$, $S_3$, $S_5$ and the odd phase-switches $S_7$, $S_9$ and closes the even stack-switches $S_2$, $S_4$ and the even phase-switches $S_6$, $S_8$.

In addition, the charge-pump controller 66 transmits reconfiguration control-signals to a reconfiguration input terminal B1 of a reconfiguration block 68. In response, the reconfiguration block 68 provides reconfiguration signals at its reconfiguration output terminals $A_1$-$A_3$. These reconfiguration signals alter the connections between the capacitors $C_1$-$C_4$ in the first and second state.

Other examples of charge pumps include Ladder, Dickson, Series-Parallel, Fibonacci, and Doubler, all of which can be adiabatically charged and configured into multi-phase or single-phase networks. A particularly useful charge pump is an adiabatically charged version of a full-wave cascade multiplier. However, diabatically charged versions can also be used.

As used herein, changing the charge on a capacitor "adiabatically" means causing at least some of the charge stored in that capacitor to change by passing it through a non-capacitive element. A positive adiabatic change in charge on the capacitor is considered adiabatic charging while a negative adiabatic change in charge on the capacitor is considered adiabatic discharging. Examples of non-capacitive elements include inductors, magnetic elements, resistors, and combinations thereof.

In some cases, a capacitor can be charged adiabatically for part of the time and diabatically for the rest of the time. Such capacitors are considered to be adiabatically charged. Similarly, in some cases, a capacitor can be discharged adiabatically for part of the time and diabatically for the rest of the time. Such capacitors are considered to be adiabatically discharged.

Diabatic charging includes all charging that is not adiabatic and diabatic discharging includes all discharging that is not adiabatic.

As used herein, an adiabatically charged switching network is a switching network having at least one capacitor that is both adiabatically charged and adiabatically discharged. A diabatically charged switching network is a switching network that is not an adiabatically charged switching network.

FIG. 4 shows the power converter 10 of FIG. 1, but with certain modifications that cause it to step down its input voltage instead of stepping it up. As was the case in FIG. 1, the controller 16 controls both the regulator 18 and the charge pump 20. However, in FIG. 4, the charge pump 20 receives an input voltage $V_{IN}$ from a voltage source 12. It then generates an intermediate voltage $V_X$ and provides that intermediate voltage $V_X$ to the regulator 18, which transforms it into an output voltage $V_{OUT}$ that is lower than the input voltage $V_{IN}$.

Suitable regulators and charge pumps are described in detail in U.S. Pat. Nos. 8,860,396, 8,743,553, 8,723,491, 8,503,203, 8,693,224, 8,724,353, 8,619,445, 9,203,299, 9,742,266, 9,041,459, U.S. Publication No. 2017/0085172, U.S. Pat. Nos. 9,887,622, 9,882,471, PCT Publication No. WO2017161368, PCT Publication No. WO2017/091696, PCT Publication No. WO2017/143044, PCT Publication No. WO2017/160821, PCT Publication No. WO2017/156532, PCT Publication No. WO2017/196826, and U.S. Publication No. 2017/0244318.

The charge pumps and regulators described in the above-mentioned references have switches that open and close in the normal course of operation. The act of opening and closing these switches does not amount to changing the mode. The term "reconfiguration" expressly excludes the opening and closing of these switches during normal operation for the purpose of causing voltage regulation.

In the context of the regulator 18, the term "mode" shall be construed such that the mere act of closing or opening a switch in the regulator 18 would not necessarily amount to a change in "mode." For example, merely changing duty cycle of the switch does not result in a change in "mode." Similarly, when any switch in a regulator, either alone or in combination with other switches, transitions between being open and closed, this would not necessarily mean that the regulator 18 has transitioned between two modes.

In particular, the opening and closing of the switch S, as shown in FIGS. 2B-2E, shall not be construed as changing the "mode" of operation. This should be readily apparent because the opening and closing of switch S is controlled by the second control-signal 24 whereas the change in the regulator's operating mode is controlled by the first control-signal 22.

The ability to reconfigure either or both the regulator 18 and the charge pump 20 provides a way to expand the operating range of the power converter 10. The regulator 18 has only a finite operating range. Therefore, for a given charge-pump mode, the extent to which the regulator 18 is required to regulate could surpass its operating range. By changing the charge-pump's operating mode, it becomes possible to reduce the demands on the regulator 18 so that the regulator 18 can continue to operate within its operating range. This, in turn, expands the operating range of the power converter 10 as a whole.

In general, the output voltage $V_{OUT}$ is the result of having carried out first and second voltage transformations. The charge pump 20 carries out gross transformations whereas the regulator 18 carries out fine adjustments. This cooperation between the charge pump 20 and the regulator 18 expands the power converter's operating range and promotes its efficiency.

In FIG. 1, the regulator 18 carries out the first voltage-transformation and the charge pump 20 carries out the second voltage-transformation. The ordinal adjectives "first" and "second" are not meant to imply that one comes before the other. As is apparent from comparing FIGS. 1 and 4, the regulator 18 can be placed on either side of the charge pump 20.

Referring now to FIG. 1, the charge pump 20 multiplies its input voltage, which in FIG. 1 is the intermediate voltage $V_X$, by some fixed ratio defined by its voltage-transformation ratio. However, if the desired output voltage $V_{OUT}$ is not an exact multiple of the power converter's input voltage $V_{IN}$, this will not be satisfactory.

This situation arises quite frequently. For example, the power converter's input may be derived from a battery voltage, which tends to diminish with time. However, the battery voltage does not diminish in convenient steps to match the available voltage-transformation ratios. It does so along a continuum of values. If all that can be done is to multiply the input voltage $V_{IN}$ by a fixed ratio, there will be a great many unattainable values of the output voltage $V_{OUT}$.

This is in part why the regulator 18 is needed. In FIG. 1, the regulator 18 is able to adjust the input of the charge pump 20 in very small increments of voltage so that the output voltage $V_{OUT}$ can be made close enough to the target value to be satisfactory. In FIG. 4, the regulator 18 is able to adjust the output of the charge pump 20 in very small increments of voltage so that the output voltage $V_{OUT}$ reaches the target value.

The controller 16 typically operates in a feedback loop. It compares some signals or measured variables received along the input-signal path 23 that are associated with operation of the power converter 10 with target values for these variables. The variables received along the input-signal path 23 include the intermediate voltage $V_X$, the input voltage $V_{IN}$, the output voltage $V_{OUT}$, the current through inductor L in regulator 18 (i.e. $I_{LX}$), or the output current into load 15 (i.e. $I_{OUT}$). In either case, this results in an error signal that indicates the difference between this measured value and the target value. For example, based on the error signal, the controller 16 adjusts the duty cycle of the switch S in the regulators 18 show in FIGS. 2B-2E using the second control-signal 24. In due course, this corrects the error.

As noted above, the charge pump 20 is one that can be reconfigured to have different voltage-transformation ratios. A difficulty that arises is that reconfiguration of the charge pump 20 and/or the regulator 18 can result in a large and immediate error signal due to the corresponding change in the regulator's steady-state operating point. Although the feedback loop can adjust the duty cycle of a switch S in the regulator 18 to correct this error, the time required for this to take place can be too long to tolerate. Another difficulty that arises from reconfiguration of the charge pump 20 and/or the regulator 18 is a sizeable disturbance at the output voltage $V_{OUT}$. The disturbance takes the form of a voltage overshoot or undershoot at the output voltage $V_{OUT}$. In a voltage overshoot, the output voltage $V_{OUT}$ is higher than its target value. In a voltage undershoot, the output voltage $V_{OUT}$ is lower than its target value.

Figure 5:
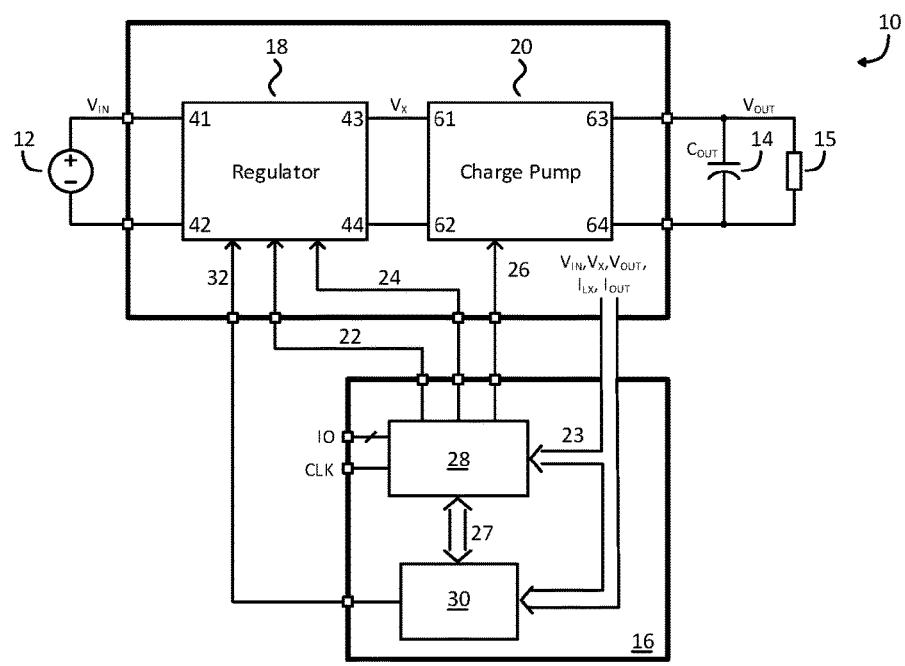
FIG. 5 shows details of the controller in FIGS. 1 and 4.

To accelerate this correction, it is useful for the controller 16 to carry out more than feedback control. In particular, as shown in FIG. 5, the controller 16 is a composite of a steady-state controller 28 and a transient controller 30. The steady-state controller 28 is a feedback controller that handles steady-state operation. The transient controller 30 anticipates the consequences of a decision to reconfigure a circuit and does what is required to reduce the undesirable transient effects of reconfiguration.

FIG. 5 shows a steady-state controller 28 that receives a clock signal CLK, external signals IO, and signals along an input-signal path 23 (including $V_{IN}$, $V_X$, $V_{OUT}$, $I_{LX}$, $I_{OUT}$) describing the operating conditions of the regulator 18 and the charge pump 20. In some embodiments, the steady-state controller 28 also receives signals from a transient controller 30 along a bidirectional path 27.

The steady-state controller 28 then generates the first, second and third control-signals 22, 24, 26 that respectively determine the regulator mode, the regulator duty cycle and the charge pump voltage-transformation ratio or mode, all of which generally handle steady-state operation. In addition, the steady-state controller 28 may also transmit signals to the transient controller 30 along the bidirectional path 27. The transient controller 30 also receives signals along the input-signal path 23 and generates, as its output, a fourth control-signal 32 that is provided to the regulator 18.

Figure 6:
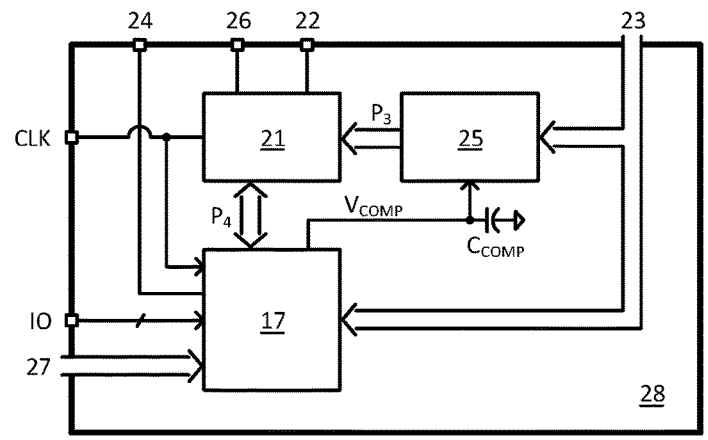
FIG. 6 shows an embodiment of the steady-state controller in FIG. 5.

FIG. 6 shows an alternative embodiment in which the steady-state controller 28 has a sensor 25, a logic block 21, a duty-cycle controller 17 and compensation components, including a compensation capacitor $C_{COMP}$. In some implementations, the sensor 25 comprises an A/D converter that converts some or all of the signals along the input-signal path 23 into digital signals to be provided to the logic block 21.

A variety of implementations are available for the logic block 21. In some embodiments, the logic block 21 comprises a state machine that receives inputs along a path $P_3$ from the sensor 25 and inputs along a bidirectional path $P_4$ from the duty-cycle controller 17. When necessary, the logic block 21 causes a change in the regulator mode by generating the first control-signal 22 and causes a change in the charge pump mode by generating the third control-signal 26.

The duty-cycle controller 17 performs the actual task of regulating the output voltage $V_{OUT}$. In doing so, it receives a first set of operation signals along the input-signal path 23, a voltage $V_{COMP}$ from across the compensation capacitor $C_{COMP}$, a clock signal CLK, external signals IO, signals along the bidirectional path 27 and signals along the bidirectional path $P_4$. Whether or not the duty-cycle controller 17 actually uses all of these signals depends on the circuits implemented by the duty-cycle controller 17.

The duty-cycle controller 17 generates, as its output, the second control-signal 24, which, as shown in FIG. 5, is provided to the regulator 18. This second control-signal 24 controls the regulator's duty cycle. In some embodiments, the duty-cycle controller 17 also sends output signals along the bidirectional path $P_4$ to the logic block 21 for further optimization or tuning of the first and third control-signals 22, 26. In some embodiments, the duty-cycle controller 17 changes the voltage $V_{COMP}$ across the compensation capacitor $C_{COMP}$.

Figure 7A:
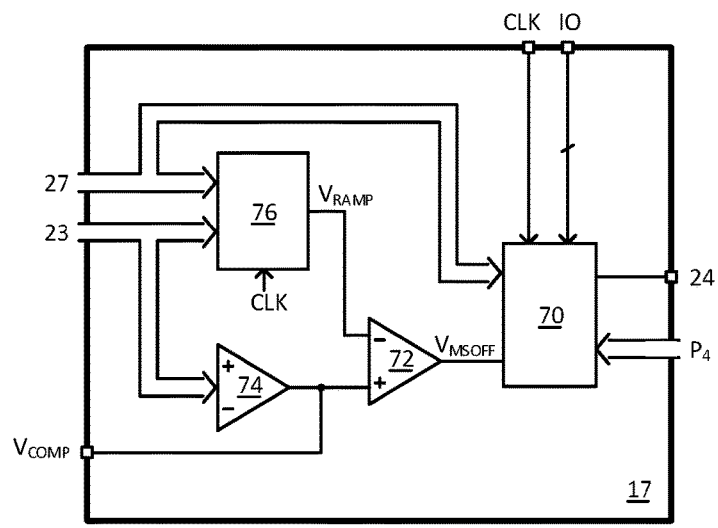
FIGS. 7A-7C show embodiments of the duty-cycle controller in FIG. 6.

In a first embodiment, shown in FIG. 7A, the duty-cycle controller 17 comprises a control-logic block 70, a pulse-width modulation ("PWM") comparator 72, an amplifier 74 and a ramp block 76. The amplifier 74 plays a role in determining the accuracy with which the output voltage $V_{OUT}$ is regulated. It does so based on some of the signals along the input-signal path 23. In some embodiments, the amplifier 74 compares the output voltage $V_{OUT}$, or a representation thereof, with a target level. A difference between the target level and the output voltage $V_{OUT}$ at the output of the amplifier 74 defines a compensation voltage $V_{COMP}$. As shown in FIG. 6, this compensation voltage $V_{COMP}$ is maintained across the compensation capacitor $C_{COMP}$.

The ramp block 76 receives some or all of the signals along the input-signal path 23 and the bidirectional path 27. Based on these signals, the ramp block 76 produces a time-varying ramp voltage $V_{RAMP}$. Embodiments include those in which the ramp voltage is a triangular waveform and those in which it is a saw-tooth waveform. The ramp voltage's frequency typically corresponds to the switching frequency of the clock signal CLK as well as the switching frequency of the regulator 18. The characteristics of the ramp voltage $V_{RAMP}$ are mainly determined by the signals from the input-signal path 23. However, in some embodiments, signals from the bidirectional path 27 participate in modifying or updating the steady-state characteristics of the ramp voltage.

The PWM comparator 72 compares the compensation voltage $V_{COMP}$ with the ramp voltage $V_{RAMP}$ and produces a logic output $V_{MSOFF}$. The control-logic block 70 receives this logic output $V_{MSOFF}$ and uses it, together with some or all of the signals along the bidirectional path 27, to generate the second control-signal 24. This is the control signal that determines the duty cycle of the regulator 18. At the same time, the control-logic block 70 may use some or all of the signals along a bidirectional path $P_4$ to further fine-tune or optimize the second control-signal 24 or to send other signals or information out along the bidirectional path $P_4$.

Figure 7B:
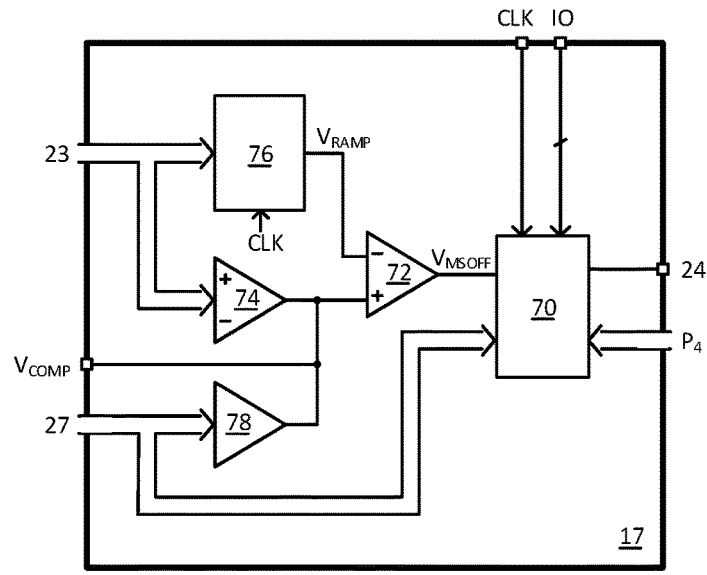

In a second embodiment, shown in FIG. 7B, the duty-cycle controller 17 includes a buffer 78 in addition to the control-logic block 70, PWM comparator 72, amplifier 74, ramp block 76 previously shown in FIG. 7A. In some implementations, the buffer 78 comprises a voltage follower with the ability to rapidly sink and source large amounts of current. This gives it the ability to reproduce, at its output, a signal applied at its input from the bidirectional path 27. This makes it possible for the buffer 78 to override the amplifier 74 and/or the previous stored voltage across the compensation capacitor $C_{COMP}$ depending on some or all of the signals received along the bidirectional path 27. This enables the buffer 78 to either increase or decrease the compensation voltage $V_{COMP}$ across the compensation capacitor $C_{COMP}$ based on the signals received along bidirectional path 27.

Figure 7C:
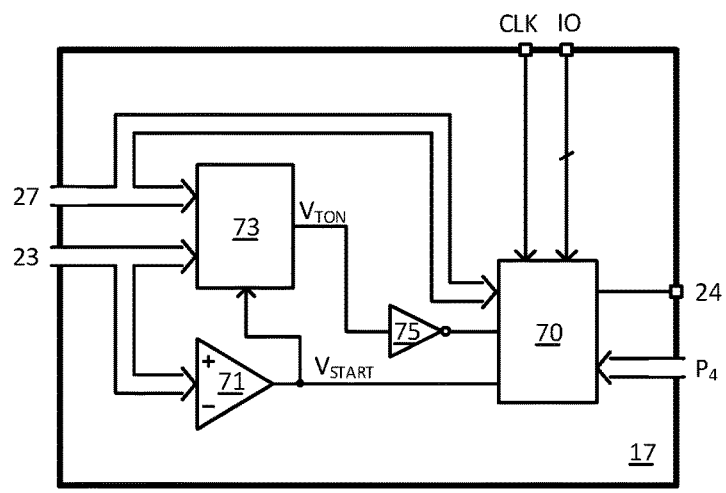

In a third embodiment, shown in FIG. 7C, the duty-cycle controller 17 comprises a control-logic block 70, a high-speed comparator 71, a pulse generator 73 and a logic inverter 75. This embodiment dispenses with the compensation capacitor $C_{COMP}$.

A useful feature of the third embodiment is its ability to describe a constant or adaptive on-time control scheme for the regulator 18 in which a pulse generator 73 dictates the pulse width of the second control-signal 24. In carrying this out, the high-speed comparator 71 produces a start voltage according to signals received along the input-signal path 23. Each voltage pulse $V_{TON}$ is initiated when the start voltage signal $V_{START}$ transitions to a logic high. The width of the voltage pulse $V_{TON}$ is typically a function of signals along the input-signal path 23. But it can be modified or updated according to additional signals along the bidirectional path 27. The voltage pulse $V_{TON}$ is inverted by logic inverter 75 before connecting to the control-logic block 70.

Figure 8A:
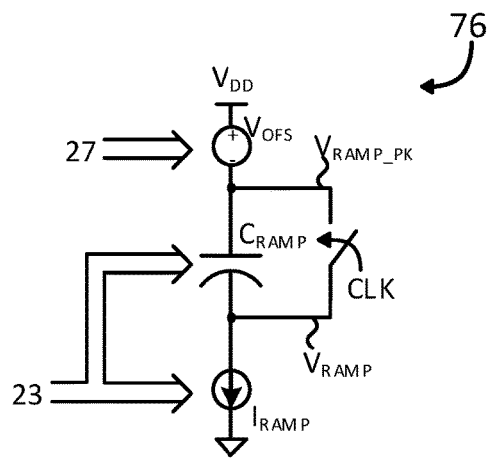
FIGS. 8A-8C show embodiments of various blocks within the duty-cycle controllers of FIGS. 7A-7C.

FIG. 8A shows an embodiment of a ramp block 76 used in duty-cycle controller 17, as shown in FIGS. 7A-7B, that generates a ramp voltage $V_{RAMP}$ used for comparison with the compensation voltage $V_{COMP}$ by the PWM comparator 72. This embodiment generates a ramp voltage $V_{RAMP}$ that is a saw-tooth waveform whose peak voltage $V_{RAMP\_PK}$, is defined by an offset voltage $V_{OFS}$ below a supply voltage $V_{DD}$.

The saw-tooth waveform begins at its peak voltage $V_{RAMP\_PK}$ when the clock signal CLK is in its first state and the ramp capacitor CRAMP is reset or fully discharged by the closed switch connected across it. When the clock signal CLK is in its second state, the switch opens and the ramp capacitor CRAMP begins to charge from the current source $I_{RAMP}$. This causes the ramp voltage $V_{RAMP}$ to decrease over time until the clock signal CLK returns to its first state again, thereby generating a saw-tooth waveform whose frequency follows that of the clock signal CLK.

Input signals along the input-signal path 23 can be used to set the magnitude of the current source $I_{RAMP}$, and/or the value of ramp capacitor CRAMP, with either one determining the amplitude of the saw-tooth waveform. Input signals along the bidirectional path 27 can be used to set or change the magnitude of the offset voltage $V_{OFS}$, which in turn determines the average or dc voltage level of the saw-tooth waveform at $V_{RAMP}$. A larger value of offset voltage $V_{OFS}$ means the saw-tooth waveform at $V_{RAMP}$ will sit further below the supply voltage $V_{DD}$ while a smaller value means the saw-tooth waveform at $V_{RAMP}$ will sit closer to the supply voltage $V_{DD}$. Alternate implementations of the ramp block 76 include flipping the order of the components between supply voltage $V_{DD}$ and ground such that the polarity of the saw-tooth waveform changes to a ramp voltage that increases over time while the clock signal CLK is in its second state.

Figure 8B:
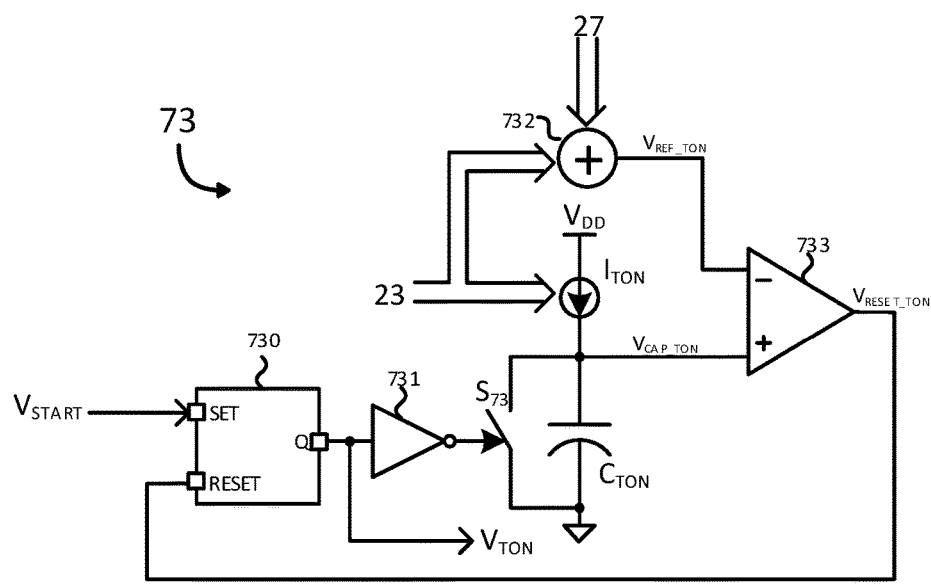

FIG. 8B shows an embodiment of pulse generator 73 having an SR latch 730. A logic inverter 731 inverts the output of the SR latch 730, which also happens to be the $V_{TON}$ output of the pulse generator 73. This inverted output drives a switch S73 that is connected across a capacitor $C_{TON}$.

When the voltage pulse $V_{TON}$ is logic low, the switch S73 closes and the capacitor $C_{TON}$ discharges. As a result, the voltage across the capacitor $V_{CAP\_TON}$, is at or close to ground.

A transition of the start voltage $V_{START}$ into a logic high at the "set" input of the SR latch 730 triggers the voltage pulse $V_{TON}$ and opens the switch $S_{73}$, thus causing the capacitor $C_{TON}$ to begin charging from the current source $I_{TON}$. As a result, the voltage across the capacitor $V_{CAP\_TON}$ begins to rise at the positive input terminal of the voltage comparator 733. The negative input terminal of the voltage comparator 733 connects to reference-voltage $V_{REF\_TON}$ while the output terminal of voltage comparator 733 drives the "reset" input of the SR latch 730.

Eventually, the voltage across the capacitor $V_{CAP\_TON}$ reaches the reference-voltage $V_{REF\_TON}$. When this happens, the output terminal of voltage comparator 733 transitions into a logic high and resets the voltage pulse $V_{TON}$ to a logic low.

The duration of the voltage pulse $V_{TON}$ is therefore proportional to the capacitance of the capacitor $C_{TON}$ and the reference-voltage $V_{REF\_TON}$ while being inversely proportional to the magnitude of the current provided by the current source $I_{TON}$. The magnitude of the current provided by the current source $I_{TON}$ and the capacitance of the capacitor $C_{TON}$ can be determined by input signals along the input-signal path 23.

The reference-voltage $V_{REF\_TON}$ is also determined by input signals along the input-signal path 23 with adjustments from input signals along the bidirectional path 27 through a summing block 732. The summing block 732 may be implemented such that input signals along the bidirectional path 27 are added to or subtracted from input signals along the input-signal path 23 to modify the reference-voltage $V_{REF\_TON}$. Another possible implementation of summing block 732 is that of an analog multiplexer that selects different combinations or subsets of input signals from the input-signal path 23 or the bidirectional path 27 depending on the reconfiguration that occurs.

Figure 8C:
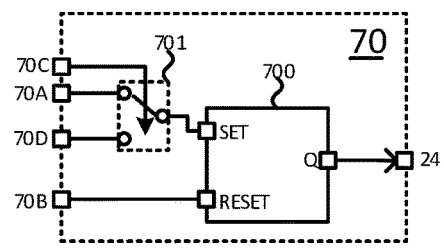

In the embodiment shown in FIG. 8C, the control-logic block 70 generates a second control-signal 24 to set the regulator's duty cycle. This embodiment includes an SR latch 700 and a digital multiplexer 701 that selects a signal from either the first input terminal 70A or a fourth input terminal 70D and passes it to the "set" input of the SR latch 700 depending on the digital multiplexer selection signal applied at third input terminal 70C. The SR latch 700 is reset when a logic high signal is applied at the second input terminal 70B.

In the duty-cycle controller 17 shown in FIGS. 7A-7B, it is possible to connect the control-logic block 70 such that the clock signal CLK connects to first input terminal 70A, the PWM comparator 72 output $V_{MSOFF}$ connects to second input terminal 70B, and signals along the bidirectional path 27 connect to third and fourth input terminals 70C-70D. In the duty-cycle controller 17 shown in FIG. 7C, the control-logic block 70 may be connected such that the start voltage $V_{START}$ connects to the first input terminal 70A, an inverted version of the pulse generator 73 output $V_{TON}$ connects to the second input terminal 70B, and signals along the bidirectional path 27 connect to third and fourth input terminals 70C-70D.

The transient controller 30 accelerates the correction in response to a reconfiguration of charge pump 20 and/or regulator 18. As a result, it reduces the time during which the output voltage $V_{OUT}$ is disturbed and the magnitude of its disturbance.

Left to its own devices, the regulator 18 would eventually reach its new steady-state duty cycle anyway. After all, the steady-state controller 28 adaptively controls the duty cycle to maintain a particular output voltage $V_{OUT}$. The transient controller 30 merely accelerates the inevitable by bypassing the steady-state controller 28 or adding feed-forward information about the nature of the upcoming reconfiguration to the steady-state controller 28 whenever a reconfiguration occurs.

Figure 9A:
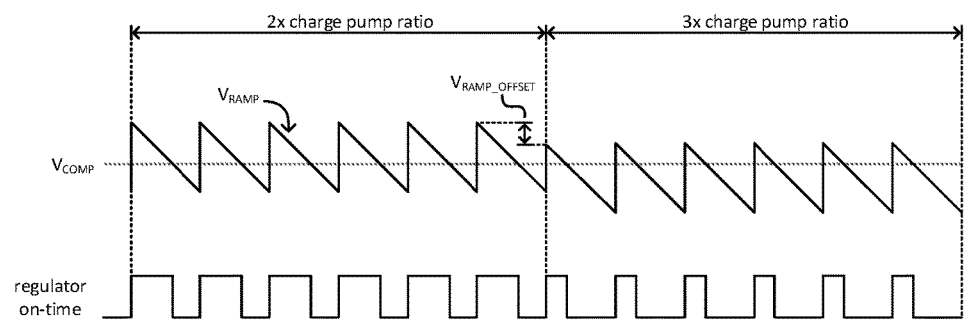
FIGS. 9A-9C show various timing waveform examples and methods of how the transient controller can adjust the regulator duty cycle ahead of the feedback loop.

In some embodiments of the duty-cycle controller 17, such as those shown in FIGS. 7A-7B, the second control-signal 24, which controls the switch S in regulator 18, such as those shown in FIGS. 2B-2E, is a function of the output from a PWM comparator 72 that compares a ramp voltage $V_{RAMP}$ with a compensation voltage $V_{COMP}$. As illustrated in FIG. 9A, the extent to which the ramp voltage $V_{RAMP}$ remains above the compensation voltage $V_{COMP}$ during the course of one ramp period determines the regulator's duty cycle, or on-time. As the compensation voltage $V_{COMP}$ decreases relative to the saw-tooth waveform shown at the ramp voltage $V_{RAMP}$, the on-time increases. Conversely, as the compensation voltage $V_{COMP}$ rises relative to the saw-tooth waveform, the on-time decreases.

FIG. 9A illustrates a timing waveform example of regulator on-time as a function of ramp voltage $V_{RAMP}$ and compensation voltage $V_{COMP}$ associated with the duty-cycle controller 17 shown in FIG. 7A and for the step-up power converter 10 shown in FIG. 1. As shown in FIG. 9A, the charge pump 20 initially operates with a first voltage-transformation ratio and the switch switch S in the regulator 18 switches according to a particular duty cycle. In the figure, the voltage-transformation ratio is 2 and the switch's duty cycle is in excess of 50%.

At some point, the charge pump 20 transitions into a mode in which it has a second voltage-transformation ratio. In the figure, this second voltage-transformation ratio is 3.

To maintain the correct output voltage $V_{OUT}$, it is necessary to reduce the duty cycle of the switch S in the regulator 18 to below 50%. Rather than wait for the steady-state controller 28 to make this adjustment over a long period of time as determined by the loop bandwidth, the transient controller 30 imposes a ramp-offset $V_{RAMP\_OFFSET}$ that, upon reconfiguration, shifts down the entire saw-tooth waveform at the ramp voltage $V_{RAMP}$ so that a smaller portion of the saw-tooth waveform lies above the compensation voltage $V_{COMP}$. This changes the duty cycle of the switch S almost immediately without requiring any or much change in the compensation voltage $V_{COMP}$, thus substantially reducing the duration and magnitude of transients associated with changing the charge pump's operating mode.

Referring to the FIG. 7A, the ramp-offset $V_{RAMP\_OFFSET}$ can be passed along the bidirectional path 27 from transient controller 30 to the ramp block 76 to cause the vertical shift in the saw-tooth waveform once the transient controller 30 receives information about the type and timing of the reconfiguration from steady-state controller 28.

Alternatively, since it is ultimately relative movement that matters, it is also possible to accomplish the same rapid change in the regulator's on-time by changing the compensation voltage $V_{COMP}$ itself.

Figure 9B:
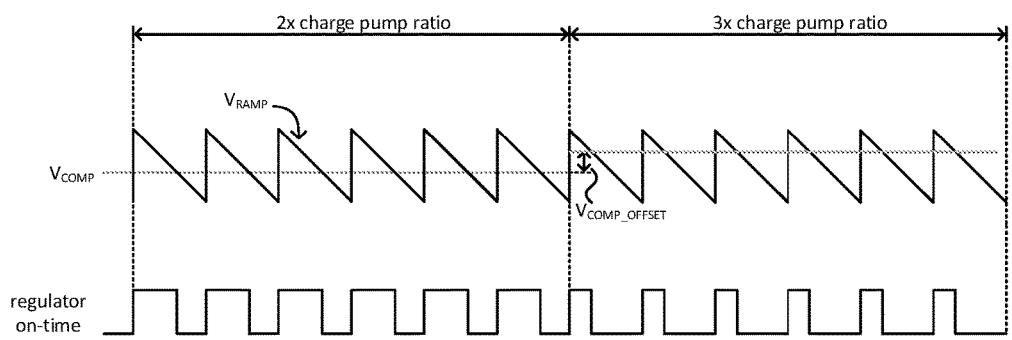

FIG. 9B illustrates a similar timing waveform example as in FIG. 9A, this time associated with the embodiment of FIG. 7B and for the step-up power converter 10 of FIG. 1. However, in FIG. 9B, the rapid change in regulator on-time is achieved when transient controller 30 causes a compensation-offset $V_{COMP\_OFFSET}$ at the compensation voltage $V_{COMP}$ while the saw-tooth waveform at the ramp voltage $V_{RAMP}$ remains at the same average or dc level. Upon reconfiguration, the positive compensation-offset $V_{COMP\_OFFSET}$ increases the compensation voltage $V_{COMP}$ relative to the saw-tooth waveform. This achieves the same result, namely a smaller portion of the saw-tooth waveform above the compensation voltage $V_{COMP}$. Once again, this effectively reduces the duty cycle of the switch S without requiring the feedback loop to do much more work in moving the compensation voltage $V_{COMP}$.

Referring to FIG. 7B, the compensation-offset $V_{COMP\_OFFSET}$ can be passed along the bidirectional path 27 from the transient controller 30 to the buffer 78 to change the compensation voltage $V_{COMP}$ once the transient controller 30 receives information about the type and timing of the reconfiguration from steady-state controller 28. As previously described, the buffer 78 needs to have the ability to sink and source large amounts of current in order to be able to rapidly change the compensation voltage $V_{COMP}$ within one or two of the regulator's switching cycles due the presence of the compensation capacitor $C_{COMP}$.

Some regulators rely on fixed or adaptive on-time control schemes instead of a PWM comparator. An example of this is the duty-cycle controller 17 shown in FIG. 7C.

Figure 9C:
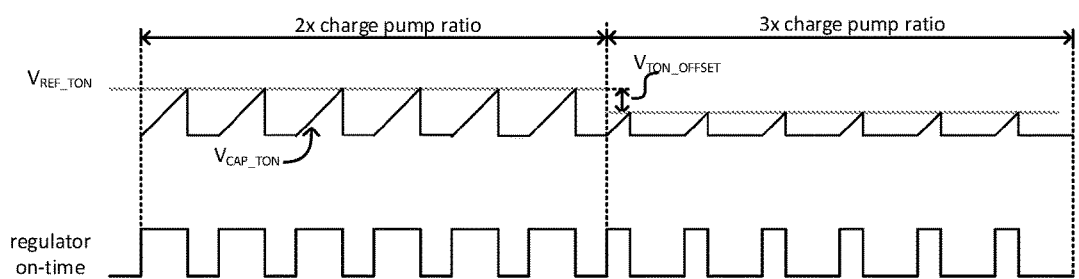

FIG. 9C illustrates a timing waveform similar to that shown in FIG. 9A, but this time associated with the embodiment shown in FIG. 7C and the step-up power converter 10 shown in FIG. 1. The timing waveform of FIG. 9C shows the sudden drop in regulator's on-time that occurs when the transient controller 30 causes a negative pulse-offset $V_{TON\_OFFSET}$ at the reference-voltage $V_{REF\_TON}$ that is then compared with the pulse generator's capacitor voltage $V_{CAP\_TON}$ to set the regulator's on-time.

When the transient controller 30 is present, the steady-state controller 28 announces its intention to reconfigure to the transient controller 30 using signals along the bidirectional path 27, as suggested by FIG. 5. In response, the transient controller 30 estimates what the new steady-state duty cycle or on-time at the regulator 18 will ultimately be. It does so using both signals from the bidirectional path 27 and signals on the input-signal path 23. A good approximation of this can be predicted using circuit models or empirically. As such, the transient controller 30 estimates the new steady-state duty cycle either algorithmically, using known circuit models, or by using a look-up table. The transient controller 30 then transmits the new steady-state information back to the steady-state controller 28 along the bidirectional path 27 through signals such as a ramp-offset $V_{RAMP\_OFFSET}$, as shown in FIG. 9A, a compensation-offset $V_{COMP\_OFFSET}$, as shown in FIG. 9B, or a pulse-offset $V_{TON\_OFFSET}$, as shown in FIG. 9C.

Certain mode changes or reconfiguration events are known to cause a voltage overshoot whereas others are known to cause a voltage undershoot at the output voltage $V_{OUT}$. The ability to predict the polarity and, to some extent, the magnitude of the disturbance at the output voltage $V_{OUT}$ can then be used to compensate for this disturbance.

For instance, in the step-up power converter 10 of FIG. 1, increasing the charge pump's voltage-transformation ratio results in a net energy deficit across the charge pump capacitors. This net energy deficit manifests itself as a voltage undershoot at the output voltage $V_{OUT}$. Conversely, decreasing the charge pump's voltage-transformation ratio results in a net energy gain across the charge pump capacitors. This net energy gain manifests itself as a voltage overshoot at the output voltage $V_{OUT}$. In either scenario, the magnitude of the net energy gain or deficit is proportional to the capacitances of the charge pump capacitors and the square of the output voltage $V_{OUT}$. This results in a voltage disturbance.

The voltage disturbance that arises from the net energy gain/deficit in the charge pump capacitors does not last as long as the voltage disturbance that arises from the change in the regulator's steady-state operating point. Nevertheless, it is still a disturbance. It is therefore useful to quell it.

One way to quell the disturbance is to have the transient controller 30 rely on knowledge of the reconfiguration type and direction. Armed with such knowledge, the transient controller 30 causes the regulator 18 to temporarily aim for an output voltage $V_{OUT}$ that differs from the target voltage, prior to the reconfiguration. In effect, the transient controller 30 temporarily controls the regulator 18 in such a way that, in the absence of a disturbance, the output voltage of the power converter would be incorrect.

When the transient controller 30 expects an output voltage overshoot, it causes the regulator 18 to temporarily aim for an output voltage $V_{OUT}$ that is lower than the target voltage and to do so before the reconfiguration actually occurs. This is referred to herein as "under-regulation." Conversely, when the transient controller 30 expects an output voltage undershoot, it causes the regulator 18 to aim for an output voltage $V_{OUT}$ that is higher than the target voltage and to do so before the reconfiguration occurs. This is referred to herein as "over-regulation."

Over-regulation is particularly useful for a power converter 10 that drives light-emitting diodes. A voltage undershoot can cause the light-emitting diodes to momentarily but noticeably dim. This kind of blinking or perceptible transient changes in the brightness is highly undesirable when providing power for a set of light-emitting diodes, such as those commonly used for displays.

One way to carry out over-regulation is to temporarily boost the target regulation voltage ahead of the reconfiguration and to then slowly reduce the target regulation voltage back to its nominal value as needed. This asymmetric change in the output voltage $V_{OUT}$ can be advantageous to avoid further transients caused by another sudden change. Similarly, one way to carry out under-regulation is to temporarily reduce the target regulation voltage ahead of the reconfiguration and to then increase the target regulation voltage back to its nominal value.

Another way to temporarily over-regulate or under-regulate is a variation on a method in connection with the examples of FIGS. 9A-9C.

Figure 10:
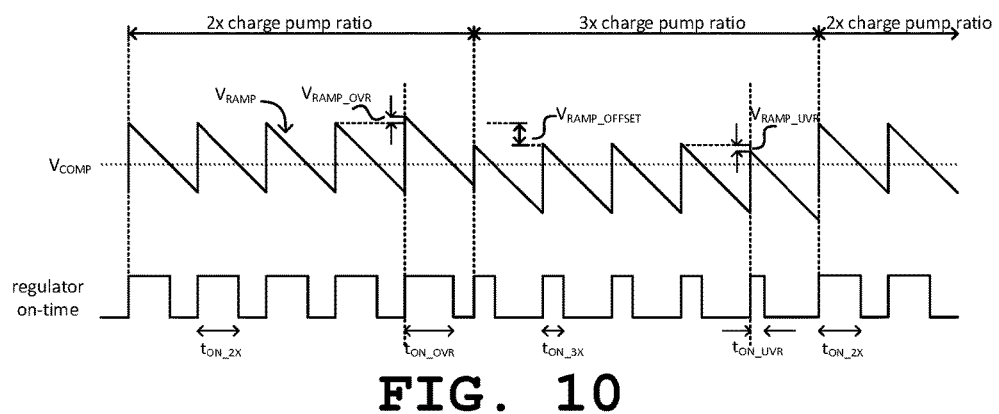
FIG. 10- shows a timing waveform example and method of how the transient controller can temporarily change the regulator duty cycle to minimize output voltage disturbances.
Figure 11A:
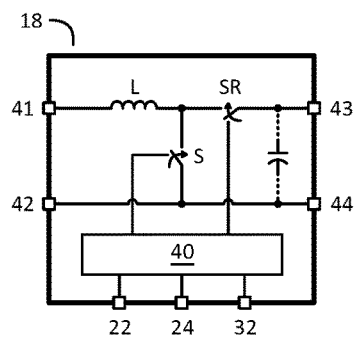
FIGS. 11A-11D show the regulators shown in FIGS. 2B-2E, but with a synchronous switch instead of a diode.
Figure 11B:
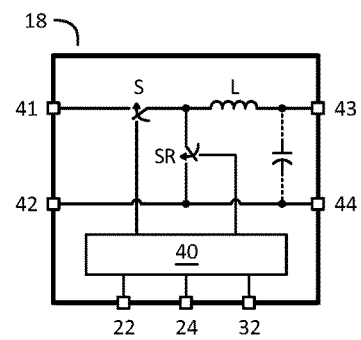
Figure 11C:
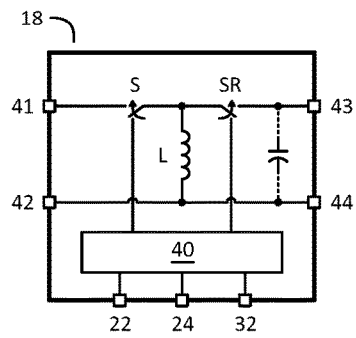
Figure 11D:
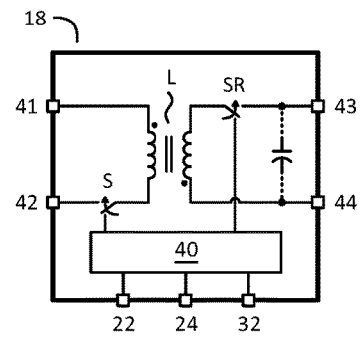

FIG. 10 illustrates a timing waveform example of regulator on-time as a function of ramp voltage $V_{RAMP}$ and compensation voltage $V_{COMP}$, associated with the duty-cycle controller 17 in FIG. 7A and the step-up power converter 10 of FIG. 1.

As shown in the figure, the charge pump 20 initially Operates with a first voltage-transformation ratio (e.g. 2× step-up ratio) with the switch S in the regulator 18 having an on-time of $t_{ON\_2X}$. At some point, the charge pump 20 transitions into a mode in which it has a second voltage-transformation ratio (e.g. 3× step-up ratio) with the switch S in the regulator 18 having an on-time of $t_{ON\_3X}$. At some later point, the charge pump 20 transitions back to a first voltage-transformation ratio with the switch S in the regulator 18 having an on-time of $t_{ON\_2X}$ again.

In the regulator switching cycle prior to changing from a first voltage-transformation ratio to a second voltage-transformation ratio, an over-regulation offset $V_{RAMP\_OVR}$ is applied to the saw-tooth waveform at ramp voltage $V_{RAMP}$. This results in a larger regulator on-time $t_{ON\_OVR}$ for this one cycle. This temporary increase in regulator on-time just before the increase in voltage-transformation ratio can be sufficient to overcome or minimize the subsequent voltage undershoot at the output voltage $V_{OUT}$ when reconfiguration actually occurs.

At some later point in the regulator switching cycle prior to changing back from a second voltage-transformation ratio to a first voltage-transformation ratio, an under-regulation offset $V_{RAMP\_UVR}$ is applied to the saw-tooth waveform at ramp voltage $V_{RAMP}$. This results in a smaller regulator on-time $t_{ON\_UVR}$ for this one cycle. This temporary decrease in regulator on-time just before the decrease in voltage-transformation ratio can be sufficient to overcome or minimize the subsequent voltage overshoot at the output voltage $V_{OUT}$ when reconfiguration actually occurs.

It should be noted that the application of the over-regulation and under-regulation offsets does not have to be confined to one regulator switching cycle. Nor is the application of these offsets restricted to the cycle prior to reconfiguration. The over-regulation and under-regulation offsets can be applied over two or more consecutive regulator switching cycles. They can even begin in the same cycle as the reconfiguration itself.

A disadvantage of this approach is that the amount of over-regulation or under-regulation applied temporarily and then removed is potentially less precise or less well-controlled. As shown in FIG. 10, this approach may be combined with the steady-state application of ramp-offset $V_{RAMP\_OFFSET}$ to quell additional voltage disturbances that come from changes in the regulator's steady-state operating point.

Each regulator 18 shown in FIGS. 2B-2E has a first switch S, a diode D, and an inductor L. In operation, each regulator 18 transitions between first and second states. In the case of FIG. 2B, during the first state, the switch S is open and current flows through the inductor L and the diode D and out of the regulator through regulator-terminal 43. During the second state, the switch S closes. This allows current in the inductor L to flow to ground. However, because of the diode D, current cannot flow backwards from regulator-terminal 43 to ground.

In alternative embodiments of the regulator 18, shown in FIGS. 11A-11D, a second switch SR replaces the diode D. The second switch SR raises the possibility of operating the regulator 18 in a third state in addition to the two states available for the regulator 18 in FIGS. 2B-2E.

In the first state, the first switch S closes and the second switch SR opens.

In the second state, the first switch S opens and the second switch SR closes. In this second state, it is possible that current flow through the inductor L changes direction so that charge flowing through the regulator-terminal 43 reverses direction.

In the third state, both the first switch S and the second switch SR are open. This prevents negative current flow through the inductor L. The availability of this third state creates the possibility of temporarily under-regulating by temporarily allowing current to flow backwards through the inductor L in the second state and then transitioning from the second state to the third state to prevent further negative current flow through the inductor L. By properly timing the temporary negative inductor current flow with a reconfiguration event that is expected to cause a voltage overshoot at the output voltage $V_{OUT}$, it is possible to quell the voltage disturbances that arise from a net energy gain across the charge pump capacitors.

Figure 12:
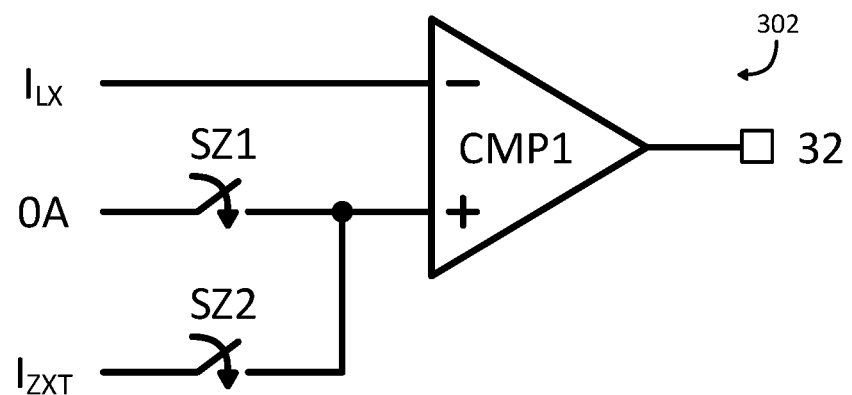
FIG. 12 shows a current-control circuit for controlling one of the switches in each of the synchronous regulators shown in FIGS. 11A-11D.

FIG. 12 shows a current-control circuit 302 that can be used to control when the transition from the second state to the third state will take place for the synchronous regulator shown in FIGS. 11A-11D.

The current-control circuit 302 features a comparator CMP1 having an output that connects to a fourth control-signal 32 used in the regulator 18 to open the second switch SR. The comparator CMP1 has a negative input and a positive input. The negative input receives the inductor current $I_{LX}$. The positive input receives the reference current. When the inductor current $I_{LX}$ reaches or falls below the reference current, the comparator CMP1 outputs a logic high at the fourth control-signal 32. This opens the second switch SR. In contrast, a logic low at the fourth control-signal 32 does not close the second switch SR. After all, it is the second control-signal 24 that indirectly determines when the second switch SR closes by controlling the first switch S.

The current-control circuit 302 shown in FIG. 12 provides first and second switches SZ1, SZ2 to choose from two different reference currents. The first switch SZ1 connects the positive input to a zero-amp current reference and the second switch SZ2 connects the positive input to some below-zero reference current $I_{ZXT}$.

In normal mode, the synchronous regulator 18 shown in FIGS. 11A-11D operates in a manner similar that of the asynchronous regulator 18 shown in FIGS. 2B-2E. In that case, the first switch SZ1 closes and the second switch SZ2 opens.

However, to permit the regulator 18 to accommodate backward-flowing inductor current, it is possible to offset the target current level so that it becomes negative. To do so, one opens the first switch SZ1 and closes the second switch SZ2 so that the second switch SR does not open until the inductor current falls below zero amps and reaches the below-zero reference current $I_{ZXT}$. Alternatively, one can simply disable the comparator CMP1 for a selected period that corresponds to the expected duration of the voltage overshoot so that the fourth control-signal 32 is prevented from turning off the second switch SR during this selected period.

Another way to allow current to flow backwards through the inductor L is to temporarily enable valley inductor current control for several switching cycles during and/or after reconfiguration. This forces the inductor current to discharge to a predetermined negative threshold such as $I_{ZXT}$ before allowing a new switching cycle to be initiated. This can be done by closing the second switch SZ2 in the current-control circuit 302 for the duration of valley inductor current control. In addition, a fourth control-signal 32 can also be connected to the fourth input terminal 70D of the control-logic block 70, as shown in FIG. 8C, while the valley inductor current control indicator connects to the third input terminal 70C so that the "set" input of the SR latch 700 uses fourth control-signal 32 to initiate each new regulator on-time.

Figure 13:
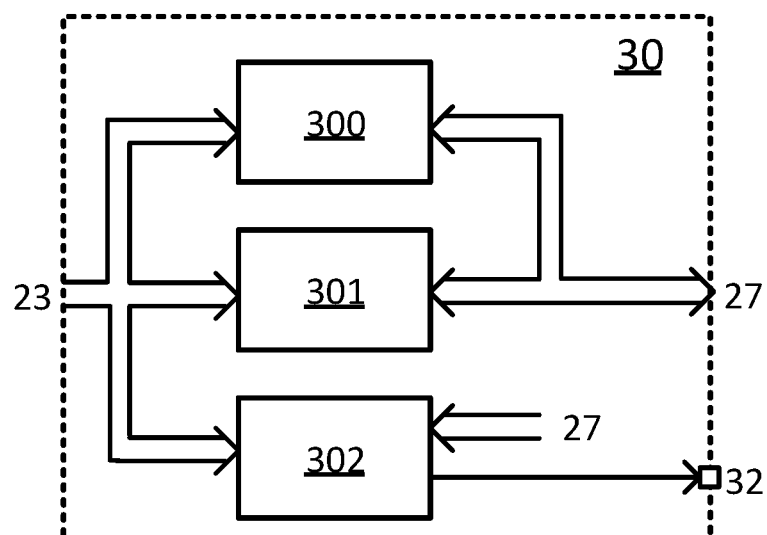
FIG. 13 shows an embodiment of the transient controller containing the current-control circuit of FIG. 12.

FIG. 13 shows an embodiment of the transient controller 30 containing the current-control circuit 302 as well as a first offset-calculator 300 and a second offset-calculator 301, all of which receive as inputs, signals from the input-signal path 23.

The current-control circuit 302 also receives inputs along the bidirectional path 27 from the steady-state controller 28, as shown in FIG. 5. It then produces an output at a fourth control-signal 32 for the regulator 18.

The first offset-calculator 300 receives inputs from the input-signal path 23 and from the bidirectional path 27. It then sends output signals, such as ramp-offset $V_{RAMP\_OFFSET}$ (or compensation-offset $V_{COMP\_OFFSET}$ or pulse-offset $V_{TON\_OFFSET}$), along the bidirectional path 27 back to the steady-state controller 28 to quell output-voltage disturbances arising from the change in steady-state operating point of regulator 18 after reconfiguration.

The second offset-calculator 301 also receives inputs from the input-signal path 23 and the bidirectional path 27. It then sends output signals, such as over-regulation offset $V_{RAMP\_OVR}$ and/or under-regulation offset $V_{RAMP\_UVR}$, along the bidirectional path 27 back to the steady-state controller 28 to quell output-voltage disturbances caused by net energy gains or deficits across the charge pump capacitors after reconfiguring the charge pump 20.

In some implementations, a computer-accessible storage-medium includes a database representative of one or more components of the power converter 10. Among these are implementations in which the database includes data representative of a charge pump 20 that has been optimized to promote low-loss operation of the charge pump 20.

As used herein, a computer-accessible storage-medium includes any non-transitory storage media accessible by a computer during use to provide instructions and/or data to the computer. Examples of computer-accessible storage-media include storage media such as magnetic disks, optical disks, and semiconductor memories.

In particular embodiments, a database representative of the system is a database or other data structure that is readable by a program and used, directly or indirectly, to fabricate the hardware comprising the system.

One example of such a database is a behavioral-level description or register-transfer level (RTL) description of the hardware functionality in a high-level design language (HDL) such as Verilog or VHDL. The description may be read by a synthesis tool that may synthesize the description to produce a netlist comprising a list of gates from a synthesis library. The netlist comprises a set of gates that also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, alternatively, the database may itself be the netlist, with or without the synthesis library, or the data set.

Having described the invention, and a preferred embodiment thereof, what is claimed as new and secured by Letters Patent is:

1. An apparatus comprising a controller that is configured to control operation of a power converter that supplies a constant output voltage at an output thereof, said power converter including a regulator that connects to a charge pump, wherein said charge pump is operable in plural charge-pump modes, and wherein said controller configured to receive information indicative of a forthcoming transition between said charge pump modes and, in response to receiving said information, to take action prior to said transition, said action having the effect of suppressing evidence of occurrence of said transition at said output when said transition later occurs.

2. The apparatus of claim 1, wherein said controller comprises a feedback controller that is configured to relinquish control over said output voltage during said transition between said charge-pump modes and to recover said control after said transition between said charge-pump modes.

3. The apparatus of claim 1, wherein said controller is configured to determine a signal for controlling said regulator in response to said information indicative of a forthcoming transition between said charge-pump modes and information concerning operation of said power converter and to apply said signal to cause a change in duty cycle of said regulator during said transition between charge-pump modes, said change in duty cycle being selected to quell a disturbance in said output voltage following said transition.

4. The apparatus of claim 1, wherein said controller is configured to determine, based at least in part on information indicative of a forthcoming occurrence of a transition between said charge-pump modes and information indicative of operation of said power converter, an offset between a compensation voltage provided to said regulator and a waveform and to apply said offset during said transition, wherein said offset controls a duty cycle of a switch in said regulator and wherein said offset is selected to quell a disturbance in said output voltage.

5. The apparatus of claim 1, wherein said controller ceases feedback control over said output voltage in anticipation of said occurrence of a transition between said charge-pump modes, wherein said controller exercises feed-forward control during said transition, and wherein said controller recovers feedback control after said transition.

6. The apparatus of claim 1, wherein said controller is configured to apply a voltage that, during steady-state operation, would cause said output voltage of said power converter to move away from a target value.

7. The apparatus of claim 1, wherein said controller is configured to expect, based at least in part on information concerning a forthcoming occurrence of a transition between said charge-pump modes and information concerning power converter operation, a direction of an expected transient and to apply a voltage that moves said output voltage contrary to said direction.

8. The apparatus of claim 1, wherein said controller is configured to expect, based at least in part on information concerning a forthcoming occurrence of a transition between said charge-pump modes and information concerning power converter operation, that a transient resulting from said transition will cause said output voltage to fall below a target voltage and to increase a duration during which a switch in said regulator connects an inductance to said charge pump.

9. The apparatus of claim 1, wherein said controller is configured to expect, based at least in part on information concerning a forthcoming occurrence of a transition between said charge-pump modes and information concerning power converter operation, that a transient resulting from said transition will cause said output voltage to rise above a target voltage and to cause said regulator to deliver less energy to support said output voltage thereby at least partially compensating for said transient.

10. The apparatus of claim 1, wherein said controller is configured to expect, based at least in part on information concerning a forthcoming occurrence of a transition between said charge-pump modes and information concerning power converter operation, that a transient resulting from said transition will cause said output voltage to fall below a target voltage and to permit current to flow through an inductor in said regulator in a direction away from said charge pump.

11. An apparatus for quelling a disturbance at an output, said apparatus comprising a control system that is configured to anticipate a change in a voltage-transformation ratio of a charge pump of a power converter that comprises said charge pump and a regulator, wherein said control system is configured to receive information indicative of a forthcoming transition between said voltage-transformation ratios and, in response to receiving said information, to take action prior to said transition, said action having the effect of suppressing evidence of occurrence of said transition at said output when said transition later occurs.

12. The apparatus of claim 11, wherein said control system comprises a feedback controller that is configured to avoid exercising feedback control over said power converter at selected times.

13. The apparatus of claim 11, wherein said control system comprises a feedback controller that is configured to interrupt feedback control over said power converter prior to said change and to recover feedback control following said change.

14. The apparatus of claim 11, wherein said power converter has an output voltage and a target output-voltage, wherein a difference between said output voltage and said target output-voltage of said power converter defines an error, and wherein said control system is configured to transmit, to said regulator, a signal that, during steady-state operation of said power converter, would cause said regulator to increase said error between said target output-voltage and said output voltage.

15. The apparatus of claim 11, wherein said regulator is configured to provide charge to said charge pump, wherein during an interval surrounding said change, said control system is configured to cause said regulator to provide a current path that causes current to leave said charge pump and enter said regulator.

16. An apparatus comprising a controller that is configured to control operation of a power converter that supplies a constant output voltage at an output thereof, said power converter including a regulator that connects to a charge pump, wherein said charge pump is operable in plural charge-pump modes, and wherein said controller is configured to receive information indicative of a forthcoming transition between said charge pump modes and in response, to suppress evidence of said transition before it manifests at said output.

17. The apparatus of claim 16, wherein said controller comprises a steady-state controller and a transient controller, wherein said transient controller is configured to control said output voltage during said transient, wherein said steady-state controller is configured to control said output voltage at times other than during said transient, and wherein controlling said output voltage comprises causing said output voltage to move towards a target value of output voltage.

18. The apparatus of claim 16, wherein said controller is configured to determine a new duty cycle for a switch in said regulator and to cause a step change to said new duty cycle during an interval within a clock cycle of said occurrence of a transition between said charge-pump modes, wherein said new duty cycle is selected to quell a disturbance in said output voltage.

19. The apparatus of claim 16, wherein said controller is configured to bypass feedback control over said output voltage in anticipation of said occurrence of a transition between said charge-pump modes and recovers feedback control after said transition.

20. The apparatus of claim 16, wherein said controller is configured to expect, based at least in part on information concerning a forthcoming occurrence of a transition between said charge-pump modes and information concerning power converter operation, that a transient resulting from said transition will cause said output voltage to fall below a target voltage and to cause said regulator to deliver more energy to support said output voltage thereby at least partially compensating for said transient.

* * * * *